(12) United States Patent
Tanaka

(10) Patent No.: US 10,666,184 B2
(45) Date of Patent: May 26, 2020

(54) MACHINE TOOL CONTROLLER

(71) Applicant: FANUC CORPORATION, Yamanashi (JP)

(72) Inventor: Shunpei Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/269,027

(22) Filed: Feb. 6, 2019

(65) Prior Publication Data

US 2019/0253018 A1    Aug. 15, 2019

(30) Foreign Application Priority Data

Feb. 13, 2018  (JP) .................................. 2018-023047

(51) Int. Cl.
    *G05B 11/01* (2006.01)
    *H02P 29/024* (2016.01)
    *G05B 19/406* (2006.01)

(52) U.S. Cl.
    CPC .......... *H02P 29/025* (2013.01); *G05B 19/406* (2013.01)

(58) Field of Classification Search
    CPC ..................................................... H02P 29/025
    USPC ......................................................... 318/560
    See application file for complete search history.

(56) References Cited

U.S. PATENT DOCUMENTS

| | | | |
|---|---|---|---|
| 2015/0051728 A1* | 2/2015 | Kim ................... | G05B 19/4061 700/175 |
| 2016/0156258 A1* | 6/2016 | Yokoyama .............. | B60L 58/20 307/82 |
| 2017/0219420 A1* | 8/2017 | Takahashi .............. | G01H 17/00 |

FOREIGN PATENT DOCUMENTS

| | | |
|---|---|---|
| JP | S60-179899 A | 9/1985 |
| JP | H03-088034 A | 4/1991 |
| JP | 2009-163607 A | 7/2009 |
| JP | 2011-205740 A | 10/2011 |
| JP | 2014121759 A | 7/2014 |
| WO | 2016/067342 A1 | 5/2016 |

OTHER PUBLICATIONS

An Office Action mailed by the Japanese Patent Office dated Jan. 28, 2020, which corresponds to Japanese Patent Application No. 2018-023047 and is related to U.S. Appl. No. 16/269,027.

(Continued)

*Primary Examiner* — Erick D Glass

(74) *Attorney, Agent, or Firm* — Studebaker & Brackett PC

(57) ABSTRACT

A machine tool controller capable of identifying the factors of a warning easily is provided. A controller of a machine tool includes a power supply monitoring unit, a power supply abnormality detecting unit, and an abnormality diagnosis unit. The power supply monitoring unit acquires measurements indicating an operating state of a machine tool and/or a peripheral device (for example, an AC power supply or a motor) of the machine tool. The power supply abnormality detecting unit detects an abnormality in the operating state of the machine tool and/or the peripheral device and outputs a signal indicating the abnormality and the measurements obtained when the abnormality was detected. The abnormality diagnosis unit automatically selects a measurement related to the abnormality among the measurements and automatically diagnoses factors of the abnormality.

4 Claims, 3 Drawing Sheets

(56) References Cited

OTHER PUBLICATIONS

An Office Action mailed by the Japanese Patent Office dated Apr. 14, 2020, which corresponds to Japanese Patent Application No. 2018-023047 with English Translation.

* cited by examiner

MACHINE TOOL CONTROLLER

This application is based on and claims the benefit of priority from Japanese Patent Application No. 2018-023047, filed on 13 Feb. 2018, the content of which is incorporated herein by reference.

BACKGROUND OF THE INVENTION

Field of the Invention

The present invention relates to a controller of a machine tool.

Related Art

Conventionally, a controller that outputs a warning when a failure occurs in an operation of a machine tool is known. When an abnormality occurs in a power supply or a motor driving device used in a machine tool, a controller outputs a warning and stores data obtained when the abnormality occurred. An operator of the machine tool determines whether the abnormality is associated with the power supply or the motor driving device on the basis of the stored data (see Patent Document 1).

As a configuration for identifying a more detailed abnormality factor, a machine tool including an abnormality diagnosis device is known (see Patent Documents 2 and 3). In a configuration of Patent Document 2, the abnormality diagnosis device is provided separately from the machine tool. The abnormality diagnosis device analyzes the symptoms of an abnormality input by an operator and estimates the abnormality factor. In a configuration of Patent Document 3, a machine tool that displays the details of the abnormality factor is proposed.

Patent Document 1: Japanese Unexamined Patent Application, Publication No. 2011-205740
Patent Document 2: Japanese Unexamined Patent Application, Publication No. H03-088034
Patent Document 3: Japanese Unexamined Patent Application, Publication No. S60-179899

SUMMARY OF THE INVENTION

However, in the configuration of Patent Document 1, although it is determined whether the abnormality factor is associated with the power supply or the motor driving device, an operator has to examine respective locations in order to identify the abnormality factor. For example, when an abnormality occurs in a peripheral device of a machine tool, an operator selects abnormal values among stored data and examines the locations serving as the factors of the abnormal values. Therefore, it takes a considerable amount of time for the operator to identify the factors of a warning.

In the configuration of Patent Document 2, although the factors of an abnormality are analyzed by an abnormality diagnosis device, it takes time and effort for the operator to input the symptoms of the abnormality to the abnormality diagnosis device. In the configuration of Patent Document 3, although the details of an abnormality are displayed, a function of analyzing the factors of an abnormality automatically is not provided.

An object of the present invention is to provide a machine tool controller capable of identifying the factors of a warning easily.

(1) A controller of a machine tool (for example, a controller 100 described later) of the present invention including: a sensor (for example, a power supply monitoring unit 170 described later) that acquires measurements indicating an operating state of the machine tool and/or a peripheral device of the machine tool (for example, an AC power supply 120 or a motor 160 described later); an abnormality detecting unit (for example, a power supply abnormality detecting unit 180 described later) that detects an abnormality in the operating state of the machine tool and/or the peripheral device and outputs a signal indicating the abnormality and the measurements obtained when the abnormality was detected; and an abnormality diagnosing unit (for example, an abnormality diagnosis unit 195 described later) that automatically selects a measurement related to the abnormality among the measurements and automatically diagnoses factors of the abnormality.

(2) The controller of the machine tool according to claim 1, further including: a control unit (for example, a control unit 190 described later), a display unit (for example, a display unit 300 described later), and a storage unit (for example, a storage unit 197 described later), wherein a name of the abnormality, factors of the abnormality, and a measurement related to the abnormality are displayed on a display screen of the display unit, and the name of the abnormality, the factors of the abnormality, and the measurement related to the abnormality are stored in the storage unit.

(3) The controller of the machine tool according to (2), wherein when it is determined that the factors of the abnormality are eliminated and a normal operation is possible, the abnormality detecting unit outputs a signal indicating that the abnormality is not present to the control unit, and the control unit changes the display screen to a normal operation screen, restarts an operation of the machine tool and/or the peripheral device, and refers to the storage unit to display an occurrence of the abnormality on the display screen as a history.

(4) The controller of the machine tool according to (2), wherein when it is determined that the factors of the abnormality are eliminated and the abnormality can be recovered, the abnormality detecting unit outputs a signal indicating that the abnormality is not present to the control unit, and the control unit displays a history indicating an occurrence of the abnormality on the display screen.

According to the present invention, it is possible to provide a machine tool controller capable of identifying the factors of a warning easily.

DETAILED DESCRIPTION OF THE INVENTION

Figure 1:
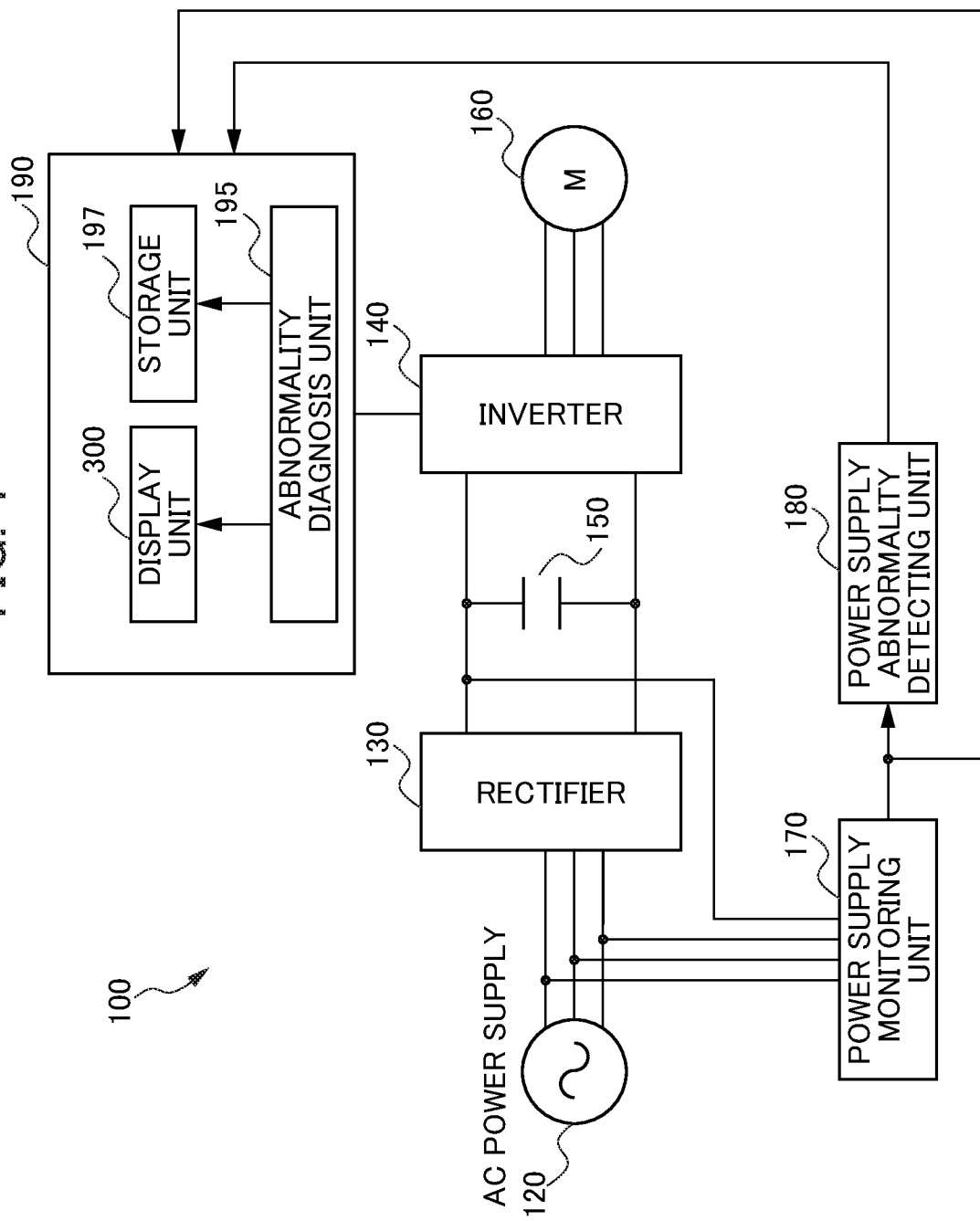
FIG. 1 is a functional block diagram of a controller according to an embodiment of the present invention.

Hereinafter, an embodiment of the present invention will be described with reference to the drawings. FIG. 1 is a functional block diagram of a controller 100. A rectifier 130 converts an alternating current (AC) from an AC power supply 120 to a direct current (DC). An inverter 140 converts a DC current from the rectifier 130 to an AC current and supplies the AC current to a motor 160. A smoothing capacitor 150 for removing noise is provided between the rectifier 130 and the inverter 140.

A power supply monitoring unit 170 detects measurements (that is, a voltage, a current, a frequency, and a voltage of the smoothing capacitor 150) input to the rectifier 130. The detected measurements are delivered to a power supply abnormality detecting unit 180 and a control unit 190. The measurements delivered from the power supply monitoring unit 170 are constantly recorded on a memory (not illustrated) provided in the control unit 190. A storage unit 197 provided in the control unit 190 has a nonvolatile memory, for example, and stores an abnormal state detected by the power supply abnormality detecting unit 180 and the measurements obtained when an abnormality was detected. The control unit 190 includes an abnormality diagnosis unit 195 that diagnoses an abnormality and a display unit 300 which will be described in detail later.

Figure 2:
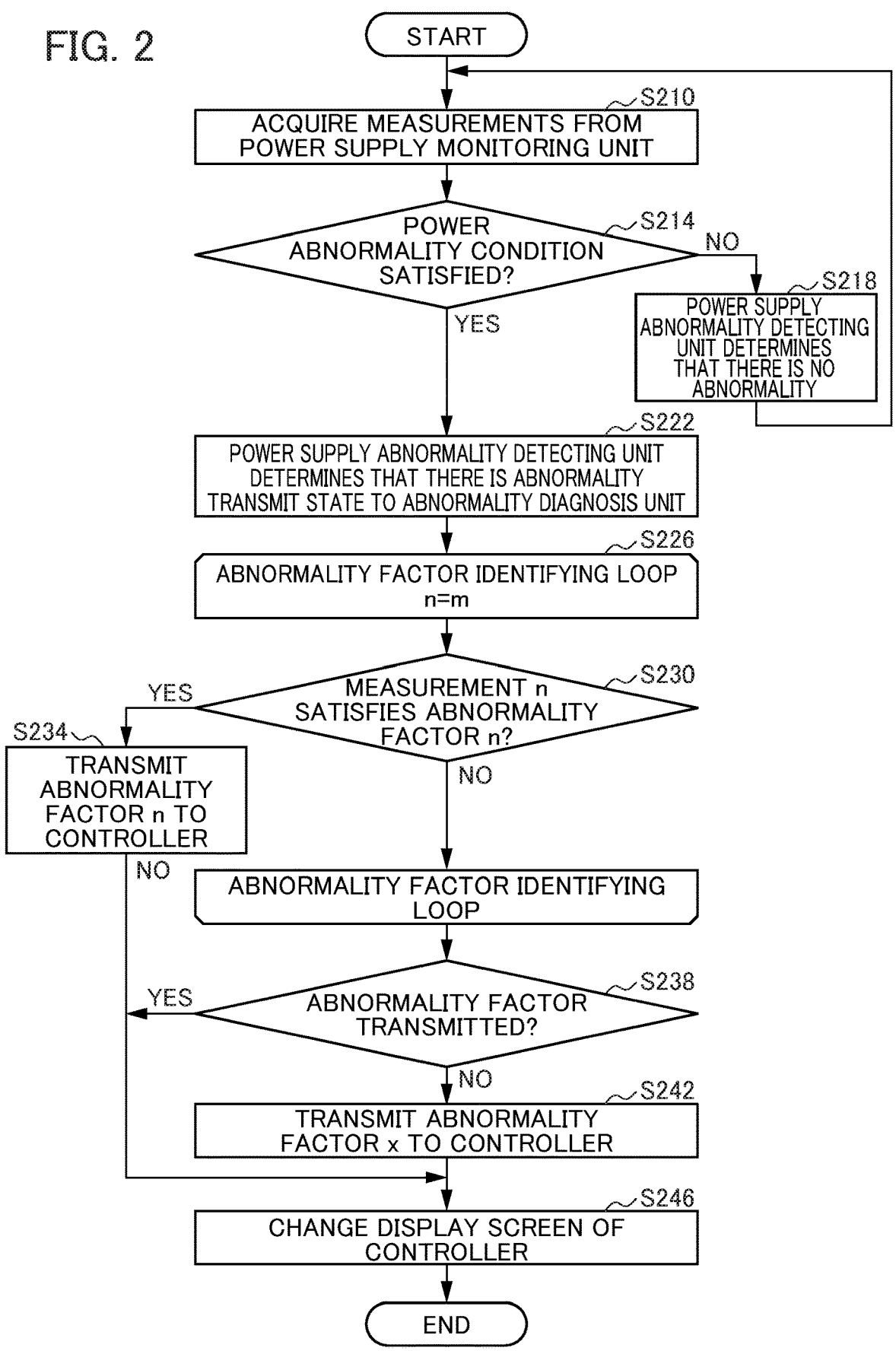
FIG. 2 is a flowchart illustrating a sequence for identifying the cause of an abnormality according to an embodiment of the present invention.

FIG. 2 is a flowchart illustrating a sequence for identifying the cause of an abnormality according to an embodiment of the present invention. The processes illustrated in FIG. 2 are performed by the power supply abnormality detecting unit 180 and the control unit 190. In the processes of steps S210 to S246, the presence of an abnormality in an operation of the machine tool is determined on the basis of various measurements, and the necessity of transitioning of a display screen is determined according to the determination result.

In step S210, the measurements detected by the power supply monitoring unit 170 (see FIG. 1) are acquired. The measurements are information on the voltage and/or the current of a peripheral device of the machine tool, including the voltage, the current, and the frequency of the AC power supply 120 (see FIG. 1), the voltage of the capacitor 150, and the speed and the acceleration of the motor 160.

When the measurements are acquired, in step S214, it is determined whether the measurements are in a normal range. The normal range is a range of values in which the controller 100 (see FIG. 1) operates normally. When the measurements are in the normal range, it is determined in step S218 that there is no abnormality.

When it is determined in step S214 that the measurements are not in the normal range, the flow proceeds to step S222. When it is determined in step S222 that there is an abnormality, the power supply abnormality detecting unit 180 (see FIG. 1) transmits a signal indicating an abnormality to the abnormality diagnosis unit 195 (see FIG. 1).

Upon receiving the signal indicating an abnormality, the abnormality diagnosis unit 195 executes a repeated process for identifying the cause of an abnormality in step S226. In an abnormality cause identifying loop, it is determined whether m (m is a positive integer) measurements satisfy an abnormality cause (that is, the measurements are in the normal range). The value of m is determined by the number of types of the measurements detected by the power supply monitoring unit 170.

When it is determined that the abnormality factor is satisfied, the abnormality factor is transmitted to the control unit 190 (see FIG. 1) in step S234. When the abnormality factor is transmitted to the control unit 190, the control unit 190 changes the display screen to such a warning screen as illustrated in FIG. 3.

When the process of the abnormality factor identifying loop in step S226 ends, it is determined in step S238 whether the abnormality factor has been transmitted to the control unit 190. When it is determined in step S238 that the abnormality factor has not been transmitted, the process of step S242 is performed.

In step S242, a signal indicating that an abnormality factor has not been identified is transmitted to the control unit 190 (see FIG. 1). In step S246, the control unit 190 changes the display screen of the display unit 300 to a warning screen and displays that an abnormality factor could not be identified.

Figure 3:
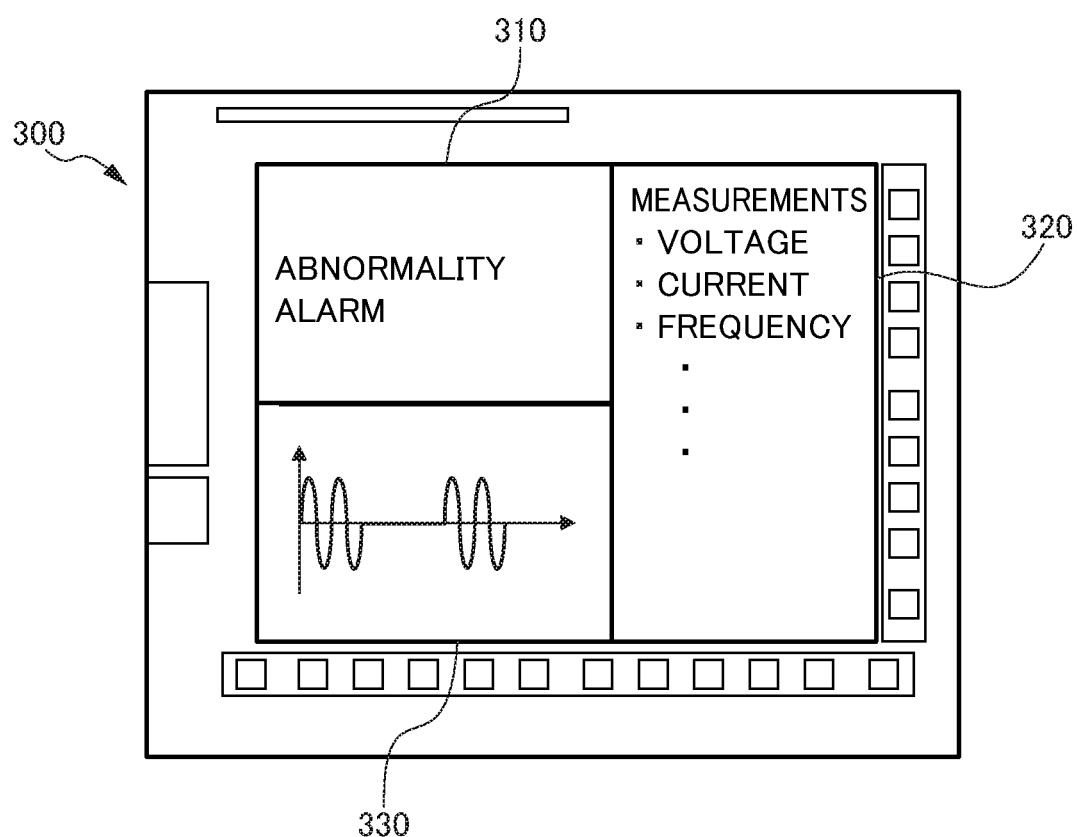
FIG. 3 is a diagram illustrating a display screen of a display unit according to an embodiment of the present invention.

FIG. 3 is a diagram illustrating the display screen of the display unit 300. The display unit 300 includes a warning region 310, a value display region 320, and a graph display region 330.

The name of an abnormality, an estimated abnormality factor, and a guidance are displayed in the warning region 310. The name of an abnormality briefly indicates the phenomenon of an abnormality such as, for example, "X-axis: Abnormality in PS input power". The estimated abnormality factor indicates a plurality of abnormality factors estimated by the abnormality diagnosis unit 195 (see FIG. 1), such as, for example, "1. PS, SV, or SP fault", "2. Abnormality in input power", and "3. MCC or cable fault". The guidance is a message for prompting more specific countermeasures such as, for example, "Power is not being supplied" and "There is fault in power cable, voltage detection cable, or input power".

The measurements obtained when an abnormality occurred are displayed in the value display region 320. The measurements are the voltage, the current, and the frequency of the power supply 120 (see FIG. 1), for example, as described above. Moreover, a graph visualized on the basis of the measurements displayed in the value display region 320 is displayed in the graph display region 330. An operator can compare the graph with the estimated abnormality factors to identify the location of the abnormality. Moreover, the operator can refer to the history of the measurements recorded on a memory (not illustrated) of the control unit 190 (see FIG. 1) to track a change in the measurements.

When the operator eliminates the abnormality factor on the basis of the guidance on the display unit 300, the measurements detected by the power supply monitoring unit 170 (see FIG. 1) return to normal values. Upon detecting that the measurements return to normal values, the power supply abnormality detecting unit 180 (see FIG. 1) transmits a signal indicating that there is no abnormality to the control unit 190.

Upon receiving the signal indicating that there is no abnormality, the control unit 190 determines that the abnormality can be recovered and changes the display screen of the display unit 300 to a normal operation screen. For example, upon receiving the signal indicating that there is no abnormality, the control unit 190 clears the warning display and displays a history indicating an abnormality occurred in the past in a predetermined region of the display unit 300. In this case, rather than clearing the warning display, the control unit 190 may automatically restart the operation of the machine tool and/or the peripheral device depending on the type of the abnormality factor. For example, when the abnormality type is a minor abnormality which does not require manual maintenance such as replacement of parts, the machine tool and/or the peripheral device may be restarted automatically.

According to the configuration of the present embodiment, the following advantages are obtained. The controller 100 diagnoses the factors of an abnormality automatically by selecting a measurement related to the abnormality automatically from m types of measurements. That is, when an abnormality occurs in the operation of a machine tool, the controller 100 identifies the factors of the abnormality by automatically making determination with respect to m types of values in the abnormality factor identifying loop. In this way, since the operator does not need to identify the abnormality factor manually, the maintenance property is improved.

In the present embodiment, although the power supply monitoring unit 170 detects the measurements of the AC power supply 120 and the capacitor 150, the measurements of the voltage and/or the current of the peripheral device of the machine tool including the speed and the acceleration of the motor 160 may be detected.

EXPLANATION OF REFERENCE NUMERALS

100: Controller
120: AC power supply (peripheral device)
160: Motor (peripheral device)
170: Power supply monitoring unit (sensor)
180: Power supply abnormality detecting unit (detector)
190: Control unit
195: Abnormality diagnosis unit
197: Storage unit
300: Display unit

What is claimed is:

1. A controller of a machine tool comprising:
   a sensor that acquires measurements indicating an operating state of the machine tool and/or a peripheral device of the machine tool;
   an abnormality detecting unit that detects an abnormality in the operating state of the machine tool and/or the peripheral device and outputs a signal indicating the abnormality and the measurements obtained when the abnormality was detected; and
   a diagnosing unit that automatically selects a measurement related to the abnormality among the measurements and automatically diagnoses factors of the abnormality,
   wherein the measurements obtained include a voltage of the peripheral device of the machine tool, a current of the peripheral device of the machine tool, a frequency of the peripheral device of the machine tool, a voltage of the peripheral device of the machine tool, a speed of the peripheral device of the machine tool, and an acceleration of the peripheral device of the machine tool.

2. The controller of the machine tool according to claim 1, further comprising: a control unit, a display unit, and a storage unit, wherein
   a name of the abnormality, factors of the abnormality, and a measurement related to the abnormality are displayed on a display screen of the display unit, and the name of the abnormality, the factors of the abnormality, and the measurement related to the abnormality are stored in the storage unit.

3. The controller of the machine tool according to claim 2, wherein when it is determined that the factors of the abnormality are eliminated and a normal operation is possible, the abnormality detecting unit outputs a signal indicating that the abnormality is not present to the control unit, and
   the control unit changes the display screen to a normal operation screen, restarts an operation of the machine tool and/or the peripheral device, and refers to the storage unit to display an occurrence of the abnormality on the display screen as a history.

4. The controller of the machine tool according to claim 2, wherein when it is determined that the factors of the abnormality are eliminated and the abnormality can be recovered, the abnormality detecting unit outputs a signal indicating that the abnormality is not present to the control unit, and
   the control unit displays a history indicating an occurrence of the abnormality on the display screen.

* * * * *